UNITED STATES PATENT OFFICE.

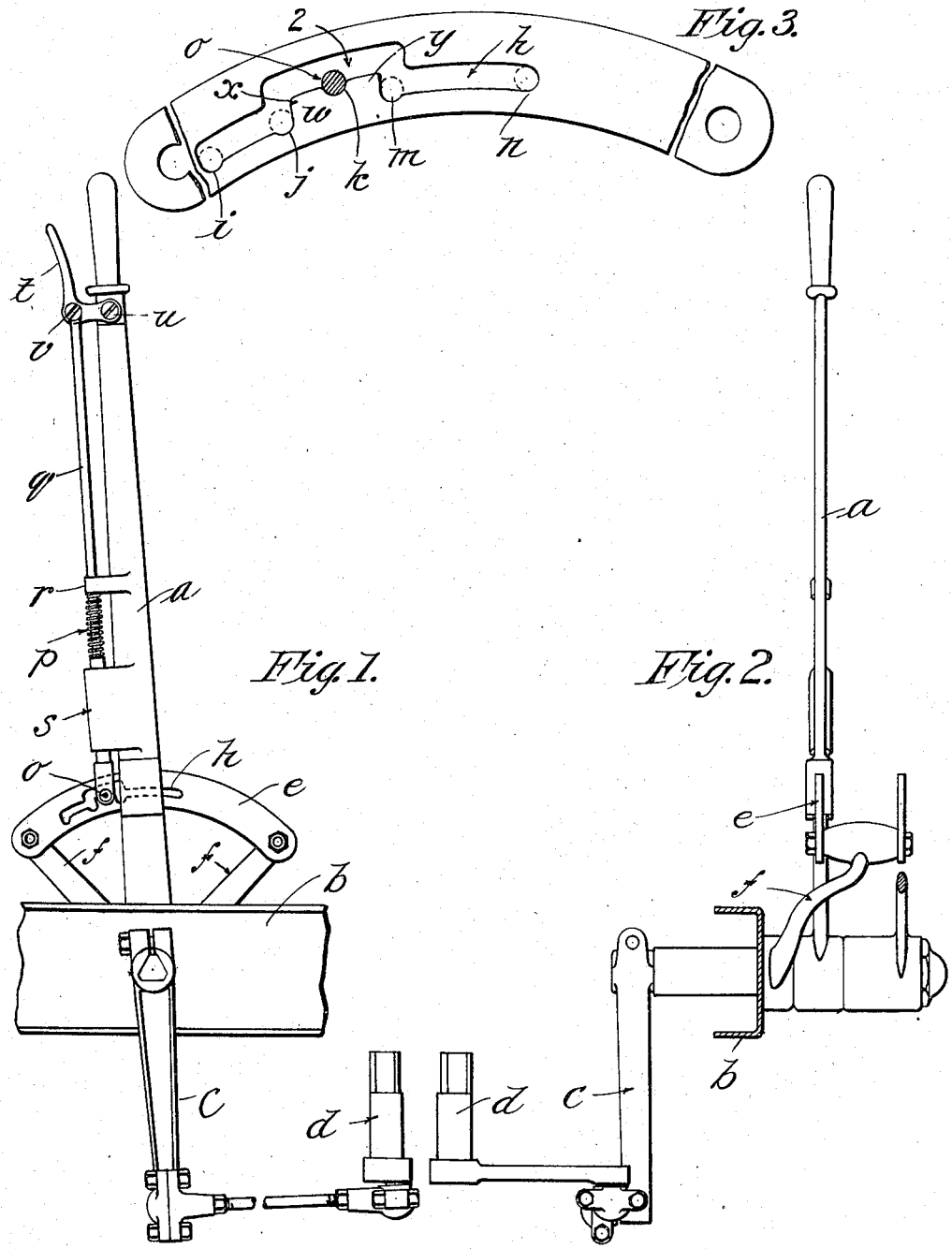

WILLIAM M. REMINGTON, OF SPRINGFIELD, MASSACHUSETTS, ASSIGNOR TO STEVENS-DURYEA COMPANY, OF CHICOPEE FALLS, MASSACHUSETTS, A CORPORATION.

LEVER-LOCKING DEVICE.

No. 858,538.      Specification of Letters Patent.      Patented July 2, 1907.

Application filed February 25, 1907. Serial No. 359,067.

*To all whom it may concern:*

Be it known that I, WILLIAM M. REMINGTON, a citizen of the United States of America, residing at Springfield, in the county of Hampden and State of Massachusetts, have invented new and useful Improvements in Lever-Locking Devices, of which the following is a specification.

This invention relates to means for preventing the operator of an automobile from accidentally shifting the change-speed gears from one position to another, as from high to low speed position, or from high or intermediate speed to slow or reverse speed position without breaking the same or injuring some part of the transmission system.

The invention broadly consists in locating an arc or sector, in which is cut in irregular shape a slot for receiving a spring-actuated retaining pin that is mounted on the speed-changing lever, the slot being of such shape that it is impossible for the pin to pass freely from one end of the slot to the other without being moved by the operator. The extreme ends of the slot represent respectively the high and reverse speed positions for the lever.

In operating automobiles, it sometimes happens that the driver, in case of emergency, is liable to throw the change speed lever from one extreme position to the other, or even to reverse speed position without thinking of the consequences that may result to the change speed gears or transmission system, as it is apparent that if the gears were suddenly shifted from high speed to slow or reverse speed positions, great danger of breaking the same or the transmission system is liable to be the result.

This invention is designed to overcome and prevent such liability to breakage of the parts referred to.

In the drawings forming part of this application,—Figure 1 is a side elevation of the change speed lever and the arc-shaped piece or sector for holding the lever in different positions of adjustment. Fig. 2 is an end elevation of Fig. 1. Fig. 3 is a detailed view of the sector for holding the change speed lever in various positions of adjustment.

Referring to the drawings, *a* designates the ordinary change speed lever that is pivoted to the framework *b* of the motor-carriage. This framework also supports the crank or lever *c* for operating the series of change speed gears that are connected to the element *d*. This portion of the structure forms no part of my invention and is merely referred to to indicate the location of the gears relative to the other parts.

*e* indicates a sector secured to the framework of the carriage by means of the bracket-arms *f*. Located within this sector *e* is an irregular shaped slot *h* having recesses or notches *i, j, k,* and *m* on the lower edge thereof. These notches are for the purpose of receiving a locking-pin *o* that is normally pressed downward by means of the spring *p* that encircles the locking-rod *q*, and is slidably mounted on the lever *a* in the lugs *r* and *s*. The upper end of the lever *a* is provided with a latch-piece *t* that is pivoted to the lever *a* at *u*, and to the rod *q* at the point *v*. When the operator presses the latch *t* inward towards the lever, the rod *q* is elevated, withdrawing the pin *o* from locking engagement with the notches *i, j, k,* and *m*, as readily understood.

Intermediate the extreme ends of the slot *h* is located a part *w* forming the two shoulder portions *x* and *y* against which the stop-pin of the lever *a* is brought in moving the same from the notch *i* to *j*, and from the reverse position *n* to the notch *m*. In order to permit the locking-pin *o* to pass around the part *w*, it is necessary for the operator to elevate the pin by operating the latch *t*, it being understood that the slot *h* is of the same dimensions throughout.

When the machine is running with the lever *a* in the high gear position at the notch *i*, should the operator wish to lower the speed of the machine, he simply throws the lever from the notch *i* to the notch *j* which represents the intermediate speed. The shoulder *x* prevents him from inadvertently throwing the lever over to the slow or reverse speed positions at the notch *k* or *m*, which might result in the breakage of the change speed gears of the machine, or damage the transmission system by such a quick movement from high speed ahead to reverse or slow speed.

In order to throw the lever *a* from the intermediate speed position to the slow or reverse, it is necessary for the operator to press the latch *t* to raise the pin so as to allow the same to pass through the portion 2 of the slot *h* into the neutral position *k*, and from this position to the slow speed forward at *m*, and into the reverse position *n*.

It is therefore seen that the operator can not damage his machine or change speed gears by inadvertently throwing the lever from one extreme end of the slot *h* to the other by reason of the stops *x* and *y* which would prevent the lever *a* from being so thrown.

The sector with this irregular shaped slot cut therein is therefore a preventive arrangement by means of which the operator can not, by quickly moving the change speed lever from one end of the slot to the other, injure his machine either by breaking the change speed gears or some part of the transmission system.

What I claim, is:—

1. In an improvement of the class described, a change speed lever, a locking-pin thereon, said lever being pivotally attached to a suitable support, a sector-shaped piece secured to the support and having an irregular-shaped slot therein, the slot being provided on its lower edge with a series of notches, and an abutment located between the ends of the same for preventing the locking pin carried by the lever from having a free movement from one end of the slot to the other.

2. In an improvement of the class described, a speed-changing lever for the transmission gears, a locking-pin carried by the lever, a sector for retaining the lever in various positions of adjustment, the sector having an irregular shaped slot therein for preventing the lever from being inadvertently thrown from one extreme position to the other, the lower edge of the slot being provided with a plurality of shoulders for preventing the locking pin from passing from one end of the slot to the other without varying its normal position.

3. An improvement in means for preventing change-speed gears from being inadvertently moved from one interengaging position to another, said means comprising a lever pivoted to a fixed part, a locking-pin carried thereby, a sector also secured to the fixed part and having a slot therein, the slot having a series of notches on one border thereof for retaining the lever in different positions of adjustment, the slot having shoulders for preventing said lever from being accidentally thrown from one notch to the other, as described.

4. In an improvement of the class described, a pivoted speed-changing lever, a locking-pin carried thereby, a sector-shaped piece operatively arranged with relation to the lever and having a continuous slot therein, the end portions of the slot being formed on the same radius, the intermediate portion of the slot being formed on a longer radius whereby shoulder portions on one border of the slot are produced and whereby said lever is prevented from free movement from one end of the slot to the other without the locking-pin being operated, as described.

WILLIAM M. REMINGTON.

Witnesses:
K. I. CLEMONS,
H. W. BOWEN.